United States Patent
Watanabe

(10) Patent No.: US 10,311,491 B2
(45) Date of Patent: Jun. 4, 2019

(54) INFORMATION PROCESSING DEVICE, INFORMATION PROCESSING METHOD, AND INFORMATION PROCESSING PROGRAM

(71) Applicant: Rakuten, Inc., Setagaya-ku, Tokyo (JP)

(72) Inventor: Taichi Watanabe, Setagaya-ku (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 704 days.

(21) Appl. No.: 14/779,342

(22) PCT Filed: Mar. 29, 2013

(86) PCT No.: PCT/JP2013/059573
§ 371 (c)(1),
(2) Date: Sep. 23, 2015

(87) PCT Pub. No.: WO2014/155687
PCT Pub. Date: Oct. 2, 2014

(65) Prior Publication Data
US 2016/0071186 A1    Mar. 10, 2016

(51) Int. Cl.
*G06Q 30/00* (2012.01)
*G06Q 30/02* (2012.01)
(Continued)

(52) U.S. Cl.
CPC ..... *G06Q 30/0282* (2013.01); *G06Q 30/0631* (2013.01); *G06Q 50/10* (2013.01);
(Continued)

(58) Field of Classification Search
None
See application file for complete search history.

(56) References Cited

U.S. PATENT DOCUMENTS 8,645,295 B1 * 2/2014 Dillard ............... G06Q 30/02
705/7.29
8,650,023 B2 * 2/2014 Brun ............... G06F 17/2765
704/1
(Continued)

FOREIGN PATENT DOCUMENTS

| JP | 2002-140542 A | 5/2002 |
|---|---|---|
| JP | 2012-038273 A | 2/2012 |
| JP | 2013-008096 A | 1/2013 |

OTHER PUBLICATIONS

Kobayashi, Opinion Mining from Web documents: Extraction and Structurization, Mar. 23, 2007, Doctoral Dissertation, Department of Information Processing. (Year: 2007).*
(Continued)

*Primary Examiner* — William J Allen
*Assistant Examiner* — Maria S. P. Heath
(74) *Attorney, Agent, or Firm* — Sughrue Mion, PLLC

(57) ABSTRACT

The information providing server obtains at least one of the first posted information on the plan posted by the user, the piece(s) of second posted information on the other plan(s) posted by the user, and the piece(s) of third posted information on the plan posted by the other user(s). Then, the information providing server identifies the subordinate rating criterion/criteria used for the user to rate the plan based on the obtained piece(s) of posted information, and presents the identified subordinate rating criterion/criteria to the user who rates the plan.

16 Claims, 8 Drawing Sheets

(51) Int. Cl.
*G06Q 50/10* (2012.01)
*G06Q 99/00* (2006.01)
*G06Q 30/06* (2012.01)
G06N 5/02 (2006.01)
G06F 17/27 (2006.01)

(52) U.S. Cl.
CPC ......... *G06Q 99/00* (2013.01); *G06F 17/2785* (2013.01); *G06N 5/02* (2013.01); *G06Q 30/02* (2013.01)

(56) References Cited

U.S. PATENT DOCUMENTS

| | | | | |
|---|---|---|---|---|
| 8,996,425 | B1* | 3/2015 | Johnson | G06Q 30/0631 |
| | | | | 705/347 |
| 9,607,325 | B1* | 3/2017 | Sriram | G06Q 30/0282 |
| 2007/0244888 | A1* | 10/2007 | Chea | G06F 17/30861 |
| 2011/0270703 | A1* | 11/2011 | Engle | G06Q 30/02 |
| | | | | 705/26.7 |

OTHER PUBLICATIONS

International Search Report for PCT/JP2013/059573 dated May 21, 2013 [PCT/ISA/210].

\* cited by examiner

FIG. 3A

| USER INFORMATION DB 21 |
|---|
| USER ID |
| LOGIN ID |
| PASSWORD |
| NICKNAME |
| NAME |
| GENDER |
| AGE |
| ADDRESS |
| ........ |

FIG. 3B

| FACILITY INFORMATION DB 22 |
|---|
| FACILITY ID |
| LOGIN ID |
| PASSWORD |
| FACILITY NAME |
| FACILITY IMAGES |
| FACILITY CHARACTERISTICS |
| PLAN ELEMENTS |
| ADDRESS |
| ......... |

FIG. 3C

HOTEL X

| CATEGORY 1 (SUPER-CATEGORY) | CATEGORY 2 (SUB-CATEGORY) | PLAN ELEMENT |
|---|---|---|
| FOOD | FOOD | INCLUDING BREAKFAST |
| | | INCLUDING LUNCH |
| | | INCLUDING DINNER |
| | INGREDIENTS | ALL-YOU-CAN-EAT CRAB |
| | | INCLUDING SPINY LOBSTER |
| | | INCLUDING ANGLERFISH HOTPOT |
| | | INCLUDING BOAT-WRAP SASHIMI |
| | | YAMAGATA BEEF |
| | | OTAWARA BEEF |
| | | TANBA BEEF |
| | | EDIBLE WILD PLANTS |
| | ALCOHOLIC | LOCAL SAKE |
| | | LOCAL BEER |
| | | WINE |
| | | SAKE |
| | | SHOCHU |
| | ADDITIONAL SERVICES | ALL YOU CAN DRINK |
| | | ROOM SERVICE |
| BATH | ROOM | ROOM WITH OPEN-AIR BATH |
| | | ROOM WITH INDOOR BATH |
| | DISCOUNT | NO CHARGE FOR RESERVED OPEN-AIR BATH |
| SERVICES | THERAPIES | MASSAGE |
| | | BEAUTY TREATMENT |
| | ADDITIONAL SERVICES | NO CHARGE FOR BRANDED YUKATA |
| | | EARLY CHECK-IN |
| | | LATE CHECKOUT |
| | | FLOOR ASSURANCE *20TH OR HIGHER |
| | LEISURE | TICKET *OUTSIDE FACILITY |
| | | DIVING |
| | | FISHING |
| ......... | | |

FIG. 3D

| PLAN INFORMATION DB 23 | | |
|---|---|---|
| FACILITY ID | PLAN ID | |
| | PLAN INFORMATION | PLAN NAME |
| | | PERIOD |
| | | CHARGE |
| | | PLAN ELEMENTS |
| | | ..... |
| | TRANSACTION INFORMATION | USER ID OF USER WHO MADE RESERVATION |
| | | DATES OF USE |
| | | THE NUMBER OF USERS |
| | | ..... |
| | PLAN SALES | |
| | PLAN OCCUPANCY RATE | |
| | POSTED INFORMATION | REVIEW |
| | | POST DATE AND TIME |
| | | USER ID OF POSTER |
| | | ..... |
| | RATING INFORMATION | RATING VALUES |
| | | RATING DATE AND TIME |
| | | USER ID OF RATER |
| | | ..... |
| ......... | | |

FIG. 3E

HOTEL X

| PLAN NAME | PLAN ELEMENT | SALES RANKING | OCCUPANCY RATE |
|---|---|---|---|
| PLAN XA | ALL-YOU-CAN-EAT CRAB | 1 | 90% |
| | NO CHARGE FOR BRANDED YUKATA | | |
| PLAN XB | INCLUDING BOAT-WRAP SASHIMI | 3 | 70% |
| | LATE CHECKOUT | | |
| PLAN XC | INCLUDING ANGLERFISH HOTPOT | 2 | 60% |
| | NO CHARGE FOR RESERVED OPEN-AIR BATH | | |
| | DIVING | | |

FIG. 4

| RATING CRITERIA INFORMATION DB 24 | | |
|---|---|---|
| SUPERORDINATE RATING CRITERIA | SUBORDINATE RATING CRITERION CANDIDATE | |
| LOCATION | CAPE | |
| | SEASIDE | |
| | RIVERSIDE | |
| | ..... | |
| ROOM | SIZE | |
| | VIEW | |
| | CLEANLINESS | |
| | ..... | |
| FOOD | QUALITY | TASTE |
| | | FRESHNESS |
| | QUANTITY (VOLUME) | |
| | DINING HALL | |
| | WAITPERSON | SERVICE |
| | | TIMING |
| | PRICE | |
| | SATISFACTORY LEVEL | |
| | SEAFOOD | CRAB (INGREDIENT) |
| | | SHRIMP (INGREDIENT) |
| | MEAT | BEEF (INGREDIENT) |
| | | PORK (INGREDIENT) |
| | ALCOHOLIC DRINKS | BEER |
| | | SAKE |
| | | SHOCHU |
| | | WINE |
| | ..... | |
| BATH | TYPE | |
| | INDOOR BATH | SIZE |
| | | WATER QUALITY |
| | | WATER TEMPERATURE |
| | OPEN-AIR BATH | SIZE |
| | | WATER QUALITY |
| | | WATER TEMPERATURE |
| | | VIEW |
| | RESERVED BATH | PRICE |
| | | TIME |
| | ..... | |
| SERVICE | INFORMATION DESK | |
| | RECEPTIONIST | |
| | PROPRIETRESS | |
| | ..... | |
| EQUIPMENT | GYM | |
| | POOL | |
| | TABLE TENNIS | |
| | ..... | |

FIG. 7

DISPLAY EXAMPLE OF RATING ENTRY PAGE

HOTEL X (110 POSTS)
DATES OF YOUR STAY: FEBRUARY 6, 2013 TO FEBRUARY 7, 2013

MR/MS. ○○, PLEASE RATE THE PLAN XA YOU USED THIS TIME.

| | | | | | |
|---|---|---|---|---|---|
| 51→ OVERALL RATING | ○ 5: EXCELLENT | ○ 4: GOOD | ○ 3: AVERAGE | ○ 2: POOR | ○ 1: TERRIBLE |
| 52→ LOCATION | ○ 5: EXCELLENT ←57 | ○ 4: GOOD | ○ 3: AVERAGE | ○ 2: POOR | ○ 1: TERRIBLE |
| ROOM | ○ 5: EXCELLENT | ○ 4: GOOD | ○ 3: AVERAGE | ○ 2: POOR | ○ 1: TERRIBLE |
| 53→ FOOD | ○ 5: EXCELLENT | ○ 4: GOOD | ○ 3: AVERAGE | ○ 2: POOR | ○ 1: TERRIBLE |
| 53a→ FRESHNESS | ○ 5: EXCELLENT | ○ 4: GOOD | ○ 3: AVERAGE | ○ 2: POOR | ○ 1: TERRIBLE |
| 54→ BATH | ○ 5: EXCELLENT | ○ 4: GOOD | ○ 3: AVERAGE | ○ 2: POOR | ○ 1: TERRIBLE |
| 54a→ SIZE | ○ 5: EXCELLENT | ○ 4: GOOD | ○ 3: AVERAGE | ○ 2: POOR | ○ 1: TERRIBLE |
| 54b→ VIEW | ○ 5: EXCELLENT | ○ 4: GOOD | ○ 3: AVERAGE | ○ 2: POOR | ○ 1: TERRIBLE |
| 55→ SERVICE | ○ 5: EXCELLENT | ○ 4: GOOD | ○ 3: AVERAGE | ○ 2: POOR | ○ 1: TERRIBLE |
| 56→ EQUIPMENT | ○ 5: EXCELLENT | ○ 4: GOOD | ○ 3: AVERAGE | ○ 2: POOR | ○ 1: TERRIBLE |

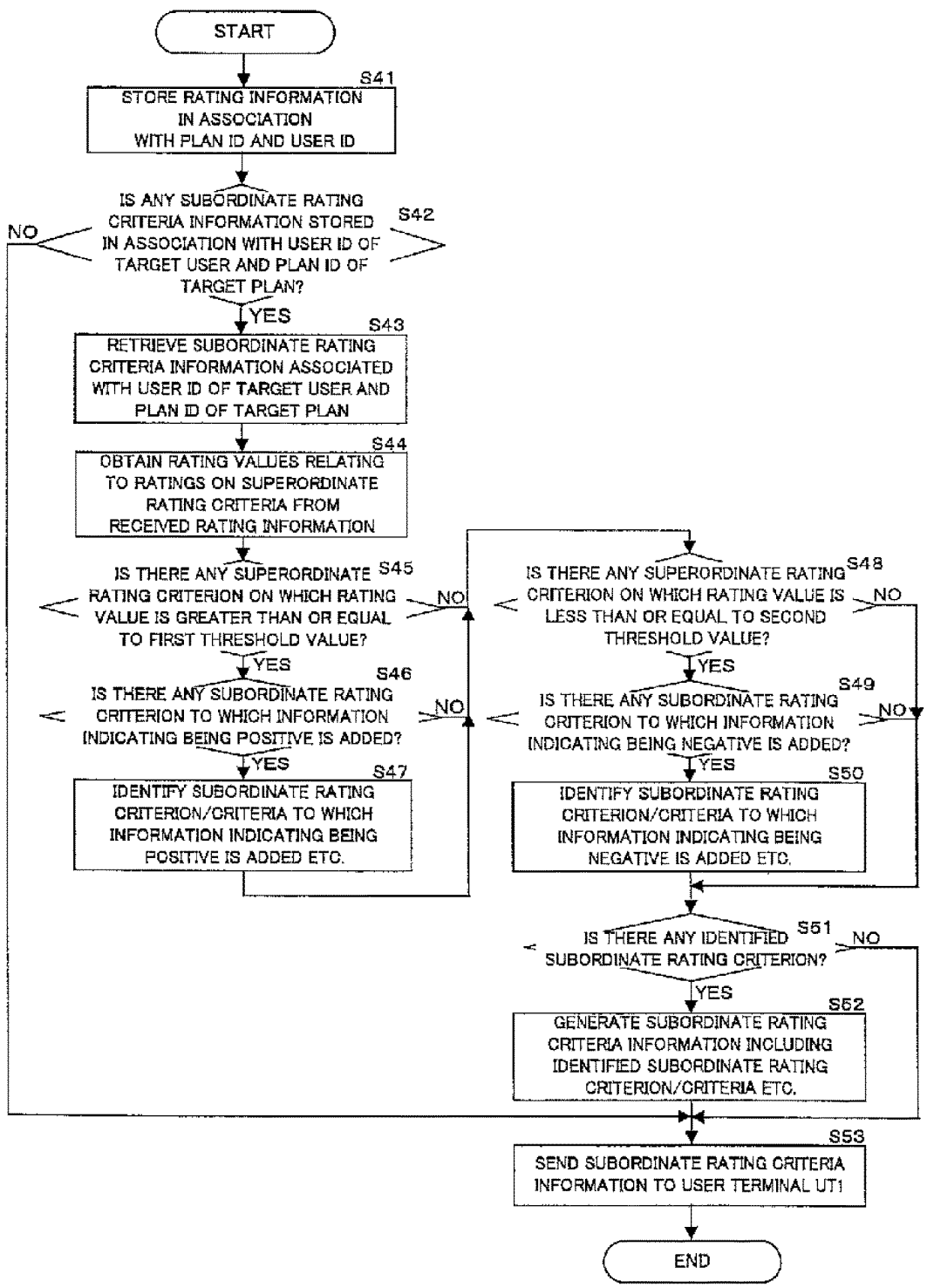

INFORMATION PROCESSING DEVICE, INFORMATION PROCESSING METHOD, AND INFORMATION PROCESSING PROGRAM

TECHNICAL FIELD

The present invention relates to the technical field of a system and the like that can present appropriate rating criteria to a rater who rates a transaction object.

BACKGROUND ART

A system is conventionally known that allows a user to rate, on each preset rating criterion, a transaction object such as an item that the user purchased or a service that the user used, on a web page provided by a website. Such ratings can be viewed by other users who intend to purchase the rated transaction object, such as an item or a service. In this connection, Patent Literature 1 discloses a merchandising system that carries proper rating data for items on its web pages to make users more satisfied with their purchases. In the technology disclosed in Patent Literature 1, different detailed rating criteria are preset for each item type.

CITATION LIST

Patent Literature

Patent Literature 1: JP 2002-140542 A

SUMMARY OF INVENTION

Technical Problem

By the way, few preset rating criteria for a transaction object, for example, general (generic) superordinate rating criteria may cause raters to roughly rate the transaction object. In this case, for example, if a user who intends to purchase a rated item is concerned about detailed (specific) subordinate rating criteria, ratings on such superordinate rating criteria may be less informative to the user. On the other hand, many preset rating criteria for a transaction object, for example, subordinate rating criteria force raters to rate it on the many rating criteria, and thus may become cumbersome and burdensome to the raters.

In view of the above points, it is an object of the present invention to provide an information processing device, an information processing method, and an information processing program that can present appropriate rating criteria to raters to reduce their burdens.

Means for Solving the Problem

In order to solve above problem, an invention described in claim 1 is characterized in that an information processing device comprises: first obtaining means for obtaining at least one of first posted information, posted by a user who rates a first transaction object, on the first transaction object, second posted information, posted by the user, on a second transaction object different from the first transaction object, and third posted information, posted by another user than the user, on the first transaction object; identifying means for identifying a rating criterion on which the user rates the first transaction object, based on the at least one piece of posted information obtained by the first obtaining means; and presenting means for presenting the rating criterion identified by the identifying means to the user who rates the first transaction object.

According to this invention, it is possible to reduce the rating burden on the user and present appropriate rating criterion/criteria to the user.

An invention described in claim 2 is characterized in the information processing device according to claim 1, wherein the identifying means identifies the rating criterion from among words included in the at least one piece of posted information obtained by the first obtaining means.

According to this invention, it is possible to promptly identify appropriate rating criterion/criteria to be presented to the user.

An invention described in claim 3 is characterized in that the information processing device according to claim 1 or 2, further comprises second obtaining means for obtaining a rating value relating to a rating, given by the user, for the first transaction object on a superordinate rating criterion corresponding to a superordinate concept of the rating criterion identified by the identifying means, wherein, when the rating value obtained by the second obtaining means is greater than or equal to a first threshold value, the identifying means identifies, as the rating criterion, a word having a corresponding relationship with a positive word included in the posted information obtained by the first obtaining means.

According to this invention, when a high rating is given by the user on a superordinate rating criterion, criterion/criteria that belong to the superordinate rating criterion and to which the user paid positive attention can be identified as the rating criterion/criteria.

An invention described in claim 4 is characterized in that the information processing device according to claim 1 or 2, further comprises second obtaining means for obtaining a rating value relating to a rating, given by the user, for the first transaction object on a superordinate rating criterion corresponding to a superordinate concept of the rating criterion identified by the identifying means, wherein, when the rating value obtained by the second obtaining means is less than or equal to a second threshold value, the identifying means identifies, as the rating criterion, a word having a corresponding relationship with a negative word included in the posted information obtained by the first obtaining means.

According to this invention, when a low rating is given by a user on a superordinate rating criterion, criterion/criteria that belong to the superordinate rating criterion and to which the user paid negative attention can be identified as the subordinate rating criterion/criteria.

An invention described in claim 5 is characterized in the information processing device according to any one of claims 1 to 4, wherein the identifying means identifies, as the rating criterion, a rating criterion candidate matching any word included in the posted information obtained by the first obtaining means, among rating criterion candidates prestored for each transaction object type in storage means.

According to this invention, appropriate subordinate rating criteria can be identified more promptly and more accurately.

An invention described in claim 6 is characterized in the information processing device according to claim 5, wherein, when no rating criterion candidates match any word included in the posted information, the identifying means identifies, as the rating criterion, a word included in the posted information, among words included in information prestored in storage means and indicating details of the first transaction object.

According to this invention, even if no relevant rating criterion candidates are found among rating criterion candidates prepared, appropriate rating criterion/criteria can be identified by utilizing information indicating details of the first transaction object.

An invention described in claim 7 is characterized in the information processing device according to claim 6, wherein, when the identifying means identifies, as the rating criterion, a word included in information indicating details of the first transaction object, the word identified as the rating criterion is added to and stored in the storage means as the rating criterion candidates.

According to this invention, since it is possible to increase the rating criterion candidates, appropriate rating criterion/criteria can be more accurately identified in the subsequent steps.

An invention described in claim 8 is characterized in the information processing device according to any one of claims 1 to 7, wherein users are classified by user attributes into a plurality of user bases, and the first obtaining means obtains the third posted information posted by the other user belonging to the same user base as the user who rates the first transaction object.

According to this invention, the accuracy of identifying rating criteria that the user attaches importance to or is concerned about can be improved.

An invention described in claim 9 is characterized in that an information processing method performed by a computer, the method comprises: obtaining at least one of first posted information, posted by a user who rates a first transaction object, on the first transaction object, second posted information, posted by the user, on a second transaction object different from the first transaction object, and third posted information, posted by another user than the user, on the first transaction object;

identifying a rating criterion on which the user rates the first transaction object, based on the obtained at least one piece of posted information; and presenting the identified rating criterion to the user who rates the first transaction object.

An invention described in claim 10 is characterized in an information processing program for causing a computer to function as: first obtaining means for obtaining at least one of first posted information, posted by a user who rates a first transaction object, on the first transaction object, second posted information, posted by the user, on a second transaction object different from the first transaction object, and third posted information, posted by another user than the user, on the first transaction object; identifying means for identifying a rating criterion on which the user rates the first transaction object, based on the at least one piece of posted information obtained by the first obtaining means; and presenting means for presenting the rating criterion identified by the identifying means to the user who rates the first transaction object.

Effect of the Invention

According to the present invention, it is possible to reduce the rating burden on the user and present appropriate rating criterion/criteria to the user.

BRIEF DESCRIPTION OF THE DRAWINGS

FIG. 3A is a diagram showing an example of information (entries) stored in the user information database 21.

FIG. 3B is a diagram showing an example of information stored in the facility information database 22.

FIG. 3C is a diagram showing an example of plan elements of a hotel X.

FIG. 3D is a diagram showing an example of information stored in the plan information database 23.

FIG. 3E is a diagram showing an example of the plan names, the plan elements, the sales rankings, and the occupancy rates of plans available in the hotel X.

FIG. 4 is a diagram showing an example of information stored in the rating criteria information database 24.

FIG. 7 is a diagram showing a display example of the rating entry page to which the rating entry fields corresponding to the subordinate rating criteria are added.

FIG. 8 is a flowchart indicating the second example of the subordinate rating criteria presentation process in the system controller 4 of the information providing server SA.

DESCRIPTION OF EMBODIMENTS

The following describes an embodiment of the present invention with reference to the drawings. In the embodiment described below, the present invention is applied to an information providing system.

1. Configuration and Functional Overview of Information Providing System

First, a configuration and a functional overview of an information providing system S according to one embodiment of the present invention will be described with reference to FIG. 1.

Figure 1:
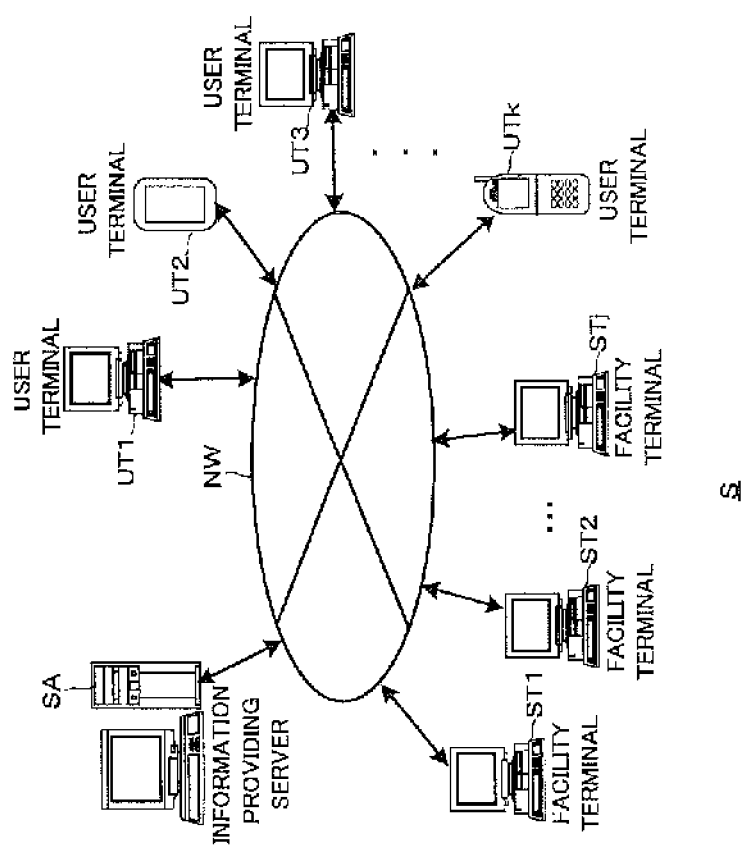
FIG. 1 is a diagram showing an example of a schematic configuration of the information providing system S according to this embodiment.

FIG. 1 is a diagram showing an example of a schematic configuration of the information providing system S according to this embodiment. As shown in FIG. 1, the information providing system S includes a plurality of user terminals UTn (n=1, 2, 3 . . . k), a plurality of facility terminals STm (m=1, 2, 3 . . . j), and an information providing server SA (an example of an information processing device). The user terminals UTn, the facility terminals STm, and the information providing server SA are each connected to a network NW. The network NW includes, for example, the Internet, a dedicated communication line (e.g., community antenna television (CATV) line), a mobile communication network (including base stations), and a gateway.

Each of the user terminals UTn and the facility terminals STm may be, for example, a personal computer (PC), a mobile phone, a personal digital assistant (PDA), a handheld device (smartphone) combining a mobile phone and a personal digital assistant, or a terminal device such as a handheld game console. Each of the user terminals UTn and the facility terminals STm sends a page request (hypertext transfer protocol (HTTP) request) to the information providing server SA through a web browser to obtain a web page, and displays the web page in a window screen on its display.

The information providing server SA is a server (e.g., a web server and databases) installed to manage, for example, a facility reservation site. The facility reservation site is a site that allows users of the user terminals UTn to reserve the use of their desired facilities. Examples of facilities include accommodation facilities (e.g., hotels), golf course facilities, amusement facilities, public facilities, and commercial facilities.

Figure 2A:
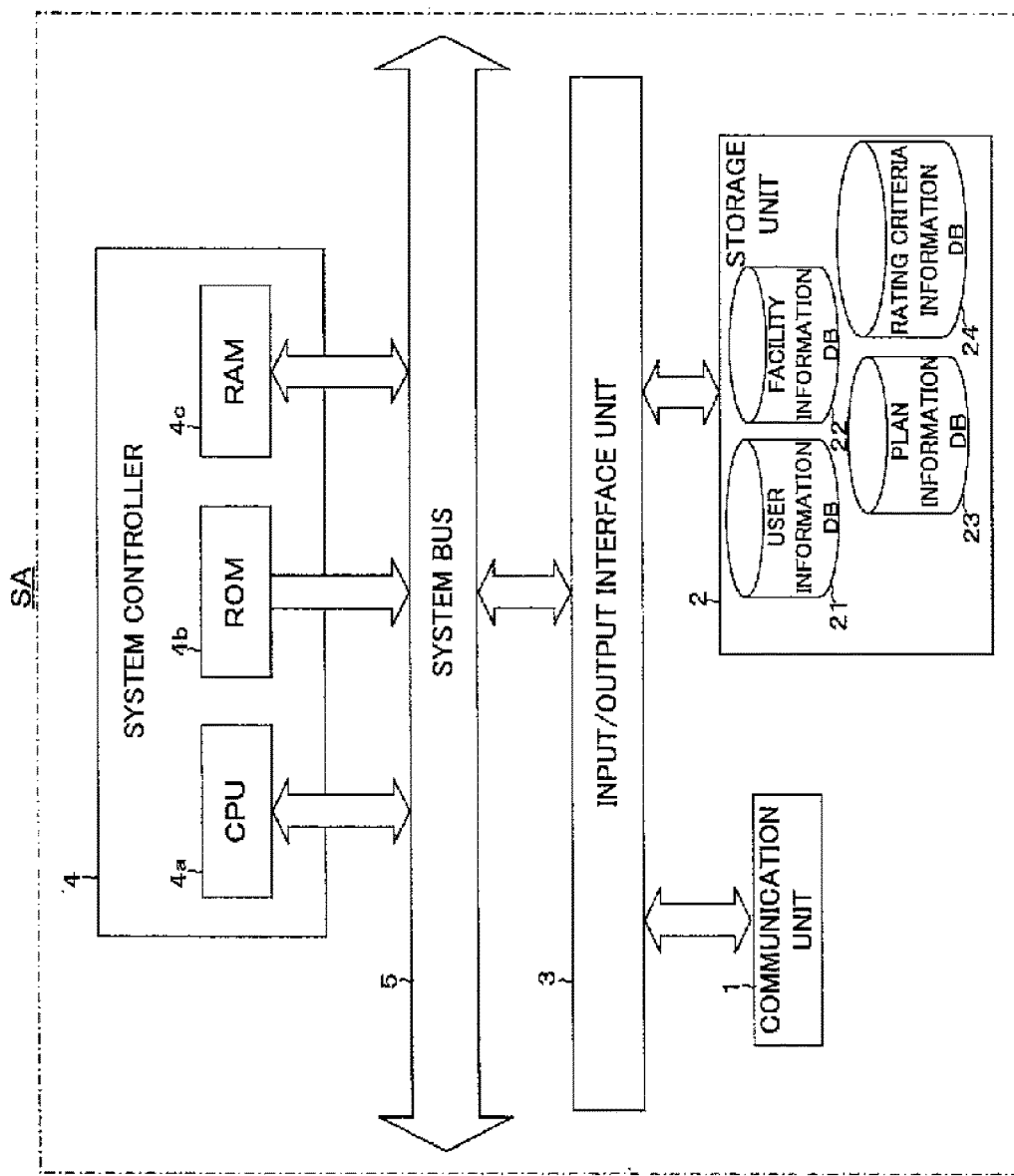
FIG. 2A is a block diagram schematically showing an example configuration of the information providing server SA according to this embodiment.

FIG. 2A is a block diagram schematically showing an example configuration of the information providing server SA according to this embodiment. As shown in FIG. 2A, the information providing server SA includes a communication unit 1, a storage unit 2, an input/output interface unit 3, and a system controller 4. The system controller 4 and the input/output interface unit 3 are connected via a system bus 5.

The communication unit 1 connects to the network NW and controls the state of communications with the user terminals UTn or the facility terminals STm.

The storage unit 2 includes, for example, hard disk drives and stores various programs, such as an operating system and server programs (including an information processing program according to the present invention). For example, the server programs may be delivered from a predetermined server or the like via the network NW, or may be provided via a (computer-readable) recording medium, such as a compact disc (CD) or a digital versatile disc (DVD), storing the programs.

The storage unit 2 also stores structured documents (e.g., hypertext markup language (HTML) documents and XHTML documents), image files, and other files that constitute web pages to be displayed on the user terminals UTn. The storage unit 2 further has, for example, a user information database (DB) 21, a facility information database (DB) 22, a plan information database (DB) 23, and a rating criteria information database (DB) 24, which have been created therein.

FIG. 3A is a diagram showing an example of information (entries) stored in the user information database 21. As shown in FIG. 3A, the user information database 21 stores, in association with each user who has signed up as a user member, the user's user ID, login ID, password, nickname, name, gender, age, address, telephone number, e-mail address, and other information, which have been registered. Each user's user ID is identification information unique to the user. The login ID and the password are authentication information used in a login process (process for authenticating the user). All or some of the user ID, the login ID, the password, the nickname, the name, the gender, the age, the address, the telephone number, and the e-mail address are input from the user terminal UTn and sent to the information providing server SA, for example, when the user signs up as a member. The user information database 21 also stores, in association with the user ID of a user who is at the stage of rating a transaction object (e.g., a user who has used a plan provided by a facility), subordinate rating criteria information indicating subordinate rating criteria to be presented to the user when the user rates the transaction object.

FIG. 3B is a diagram showing an example of information stored in the facility information database 22. As shown in FIG. 3B, the facility information database 22 stores, in association with each facility that has signed up as a facility member, the facility's facility ID, login ID, password, facility name, facility images, facility characteristics, charges, plan elements, address, telephone number, transportation & access, e-mail address, and other information. The login ID and the password are authentication information used in a login process (process for authenticating the facility). The plan elements are elements that constitute plans available in the facility. FIG. 3C is a diagram showing an example of plan elements of a hotel X. As shown in FIG. 3C, the plan elements are classified into Categories 1 (super-categories) and into Categories 2 (sub-categories). These Category 1 and Category 2 are assigned to each plan element and stored. The plan elements are determined, for example, by each facility. All or some of the facility ID, the login ID, the password, the facility name, the facility images, the facility characteristics, charges, the plan elements, the address, the telephone number, the transportation & access, and the e-mail address are sent from the facility terminal STm and are registered, for example, when the facility signs up as a member.

FIG. 3D is a diagram showing an example of information stored in the plan information database 23. As shown in FIG. 3D, the plan information database 23 stores, in association with each plan (an example of the transaction object) provided by a facility, the plan's plan ID, plan information, transaction information, plan sales, plan occupancy rate, piece(s) of posted information on the plan posted by user(s), piece(s) of rating information on the plan entered by the user(s), and other information. The plan ID and the plan information are stored in response to a request from the facility terminal STm, for example, when the facility creates the plan. The plan information database 23 stores, in association with the plan ID of the plan, the facility ID of the facility that provides the plan. The plan information is information indicating details of the plan. For example, the plan information includes information such as the name, the period, the charge, and the plan elements of the plan. The transaction information includes information such as the user ID of a user who reserved the facility, when the user will use the facility (e.g., when the user will stay there, in the case of accommodation facilities), and how many people will use the facility. FIG. 3E is a diagram showing an example of the plan names, the plan elements, the sales rankings, and the occupancy rates of plans available in the hotel X. In the example of FIG. 3E, a plan XA is the best-selling and best-occupied hot item.

Posted information on a plan entered by a user (information posted by a user) includes a character string (in any language, such as Japanese, English, or Chinese) indicating a review (e.g., an impression, an opinion, or a comment) entered by the user and the post date and time. The posted information includes the user ID of the user (poster) who posted the posted information. Alternatively, the posted information is stored in association with the user ID. The posted information may include how the user used a posting target (e.g., why the user used it, with whom the user used it, and how many people used it). Rating information on a plan entered by a user includes, for example, rating values (e.g., expressed on a scale of 1 to 5) relating to ratings for the plan given by the user. The rating information includes the user ID of the user (rater) who rated the plan. Alternatively, the rating information is stored in association with the user ID. Users can rate a plan on each of a plurality of rating criteria (also referred to as rating axes) with different viewpoints. Examples of rating criteria for plans provided by accommodation facilities include "location", "room", "food", "bath", "service (hospitality)", and "equipment (amenities)". These rating criteria are generic superordinate rating criteria. For example, the average of the rating values on these rating criteria becomes an overall rating (overall rating value) for the plan. In this embodiment, as described below, users can also rate a plan on subordinate rating criteria, which correspond to subordinate concepts of the superordinate rating criteria. For example, when a logged-in user performs a registration operation on an entry page displayed on the user terminal UTn, the posted information and the rating information on a plan entered by the user are registered.

FIG. 4 is a diagram showing an example of information stored in the rating criteria information database 24. As shown in FIG. 4, the rating criteria information database 24 stores superordinate rating criteria and subordinate rating criteria in association with each other. The subordinate rating criteria stored in the rating criteria information database 24 are subordinate rating criterion candidates to be presented to a user who rates a plan. Such subordinate rating criterion candidates may be set for each plan type (e.g., a food service and a lodging service) of plans. Keyword(s) may be set for each of the subordinate rating criterion candidates.

In the above example, the facility information database 22 and the plan information database 23 are separated from each other, but the facility information database 22 and the plan information database 23 may be integrated together. The above various databases may be included in storage means of a predetermined server that the information providing server SA can access.

The input/output interface unit 3 performs interface processing between the communication unit 1 and the storage unit 2, and the system controller 4.

Figure 2B:
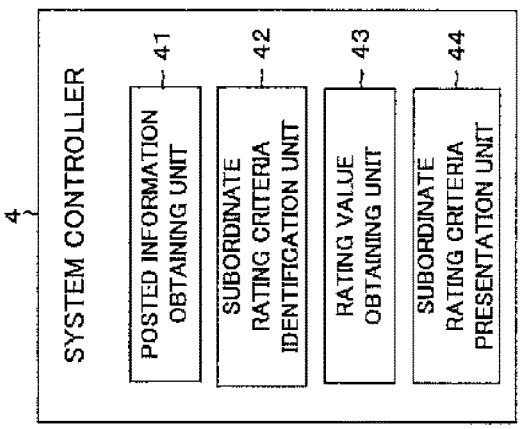
FIG. 2B is a diagram showing an example of functional blocks in the system controller 4.

The system controller 4 includes, for example, a central processing unit (CPU) 4a, a read only memory (ROM) 4b, and a random access memory (RAM) 4c. FIG. 2B is a diagram showing an example of functional blocks in the system controller 4. The system controller 4 as a computer performs a subordinate rating criteria identification process and a subordinate rating criteria presentation process in accordance with the server programs stored in the storage unit 2. In such processes, as shown in FIG. 2B, the system controller 4 functions, for example, as a posted information obtaining unit 41, a subordinate rating criteria identification unit 42, a rating value obtaining unit 43, and a subordinate rating criteria presentation unit 44. The posted information obtaining unit 41 is an example of first obtaining means of the present invention. The subordinate rating criteria identification unit 42 is an example of identifying means of the present invention. The rating value obtaining unit 43 is an example of second obtaining means of the present invention. The subordinate rating criteria presentation unit 44 is an example of presenting means of the present invention.

The posted information obtaining unit 41 obtains, from the plan information database 23, at least one of first posted information on the plan XA (an example of a first transaction object) posted by a user α (rater) who rates the plan XA, second posted information on a plan (an example of a second transaction object) different from the plan XA posted by the user α, and third posted information on the plan XA posted by a user different from the user α. The first posted information is posted information that the user α posted on the plan XA, which the user α is about to rate. When a rating for the plan XA and a post on the plan XA are made simultaneously, the first posted information may be posted information that has been entered by the user α as posted information to be posted at the time of entering ratings on at least the superordinate rating criteria. The ratings on the superordinate rating criteria may be entered before or at the same time as ratings on the subordinate rating criteria. The second posted information is posted information that the user α posted not on the plan XA, which the user α is about to rate, but on another plan. The other plan may be one of a plurality of other plans. In this case, a plurality of pieces of second posted information corresponding one-to-one to the plurality of other plans are obtained. Which criteria a user attaches importance to or which criteria the user is concerned about can be different depending on the user's use conditions (specifically, at least one of the purpose of use, the companion(s), the number of users). Thus, only piece(s) of second posted information on plan(s) (an example of the second transaction object) whose stored use conditions have at least one use condition in common with the user α's use conditions of the plan XA (an example of the first transaction object) to be rated may be obtained. For example, when the user α's family of four used the plan XA for leisure purposes, the posted information obtaining unit 41 obtains only piece(s) of second posted information on plan(s) whose use conditions have at least one use condition in common with the user α's use conditions of the plan XA. Alternatively, for example, when the number of pieces of posted information that can be obtained is limited, piece(s) of second posted information on plan(s) whose use conditions have at least one use condition in common with the user α's use conditions of the plan XA may be obtained in preference to the others, from among piece(s) of second posted information on plan(s) different from the plan XA posted by the user α. The facility that provides the other plan may be different from the facility that provides the plan XA. The third posted information is posted information on the plan XA posted not by the user α who is about to rate the plan XA but by another user. The other user may be one of a plurality of other users who posted on the plan XA. In this case, a plurality of pieces of third posted information posted by the corresponding other uses are obtained.

The subordinate rating criteria identification unit 42 identifies subordinate rating criterion/criteria to be presented when the user α rates the plan XA, based on the piece(s) of posted information (at least one of the first to third posted information) obtained by the posted information obtaining unit 41. The subordinate rating criteria correspond to subordinate concepts of the superordinate rating criteria that are always presented to any user. For example, the subordinate rating criteria identification unit 42 identifies the subordinate rating criterion/criteria from among words included in the piece(s) of posted information obtained by the posted information obtaining unit 41. Consequently, appropriate subordinate rating criterion/criteria to be presented to the user can be identified promptly. Thus identified subordinate rating criterion/criteria change depending on the content of the piece(s) of posted information and become criterion/criteria which the user α, who is about to rate the plan XA, attaches importance to or is concerned about. In contrast, the superordinate rating criteria are fixed. The first posted information is obtained in preference to the others among the first to third posted information. The reason is that the first posted information most probably includes criteria that the user α, who is about to rate the plan XA, attaches importance to or is concerned about. The second posted information and the third posted information are used as information for supplementing the first posted information. The reason for using the second posted information is that the second information can include criteria that the user α attaches importance to or is concerned about and that such criteria may not change much between different plans. The reason for using the third posted information is that when the hotel X, which provides the plan XA, has a unique criterion, the third posted information can probably include the unique criterion and that the user α may attach importance to or be concerned about such a criterion. It can be said that the second posted information can include criteria that the user α attaches importance to or is concerned about more probably than the third posted information. Thus, it is preferable that the second posted information is obtained in preference to the third posted information.

Before the subordinate rating criteria identification unit 42 identifies the subordinate rating criterion/criteria, the rating value obtaining unit 43 obtains rating values relating to ratings, given by the user α, for the plan XA on the superordinate rating criteria that correspond to superordinate concepts of the subordinate rating criteria. Then, when a rating value obtained by the rating value obtaining unit 43 is greater than or equal to a first threshold value (i.e., high) and when the piece(s) of posted information obtained by the posted information obtaining unit 41 include a positive (affirmative) word (e.g., "good"), the subordinate rating criteria identification unit 42 identifies a word (e.g., "freshness") having a corresponding relationship (e.g., a modification relation) with the positive word as a subordinate rating criterion. For examples, when the rating on the superordinate rating criterion "food" given by the user α is high, which criterion in "food" was specifically good and thus received such a high rating can be determined based on the word having a corresponding relationship with the positive word. Thus, the word having a corresponding relationship with the positive word is identified as a subordinate rating criterion (e.g., "freshness"), which corresponds to a subordinate concept of the superordinate rating criterion (e.g., "food").

On the other hand, when a rating value obtained by the rating value obtaining unit 43 is less than or equal to a second threshold value less than the first threshold value (i.e., low) and when the piece(s) of posted information obtained by the posted information obtaining unit 41 include a negative (adverse) word (e.g., "bad"), the subordinate rating criteria identification unit 42 identifies a word (e.g., "size") having a corresponding relationship with the negative word as a subordinate rating criterion. For example, when the rating on the superordinate rating criterion "bath" given by the user α is low, which criterion in "bath" was specifically bad and thus received such a low rating can be determined based on the word having a corresponding relationship with the negative word. Thus, the word having a corresponding relationship with the negative word is identified as a subordinate rating criterion (e.g., "size"), which corresponds to a subordinate concept of the superordinate rating criterion (e.g., "bath").

The subordinate rating criteria presentation unit 44 sends a web page that displays the subordinate rating criterion/criteria identified the subordinate rating criteria identification unit 42 to the user terminal UTn to present the subordinate rating criterion/criteria to the user α, who rates the plan XA on the subordinate rating criterion/criteria.

2. Operation of Information Providing System S

The following describes an operation of the information providing system S.

2-1. Subordinate Rating Criteria Identification Process

Figure 5:
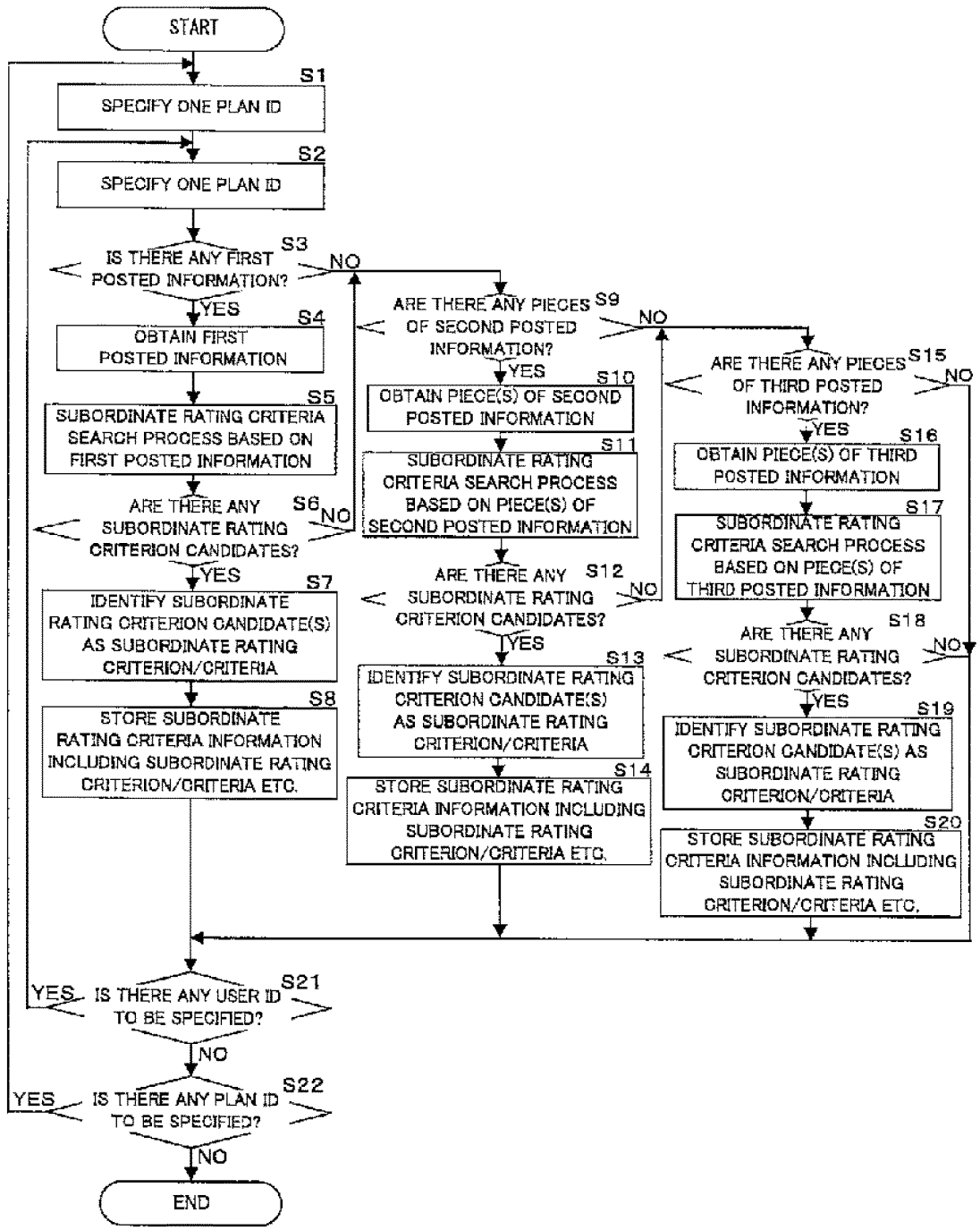
FIG. 5 is a flowchart indicating the subordinate rating criteria identification process in the system controller 4 of the information providing server SA.

First, the subordinate rating criteria identification process in the system controller 4 of the information providing server SA will be described with reference to FIG. 5. FIG. 5 is a flowchart indicating the subordinate rating criteria identification process in the system controller 4 of the information providing server SA.

The subordinate rating criteria identification process shown in FIG. 5 is initiated, for example, every time a preset time (e.g., 12:00 midnight) comes. That is, the process is a batch processing. Alternatively, the rating criteria identification process shown in FIG. 5 may be initiated every time posted information is posted (every time posted information is stored in the plan information database 23). When the process shown in FIG. 5 is initiated, the system controller 4 first specifies one plan ID from the plan information database 23 (Step S1). For example, one plan ID is specified from a list of all plan IDs or a predetermined number of plan IDs obtained from the plan information database 23. A specified flag for the specified plan ID is set to "1". Subsequently, the system controller 4 specifies one user ID from the user information database 21 (Step S2). For example, one user ID is specified from a list of all user IDs or a predetermined number of user IDs obtained from the user information database 21. A specified flag for the specified user ID is set to "1".

Then, the system controller 4 determines whether there is any posted information associated with the user ID specified in Step S2 or any posted information including the user ID (i.e., first posted information) among the piece(s) of posted information associated with the plan ID specified in Step S1 in the plan information database 23 (Step S3). If it is determined that there is such posted information associated with the user ID (YES in Step S3), the process proceeds to Step S4. That is, this case means that the user identified by the user ID specified in Step S2 posted the posted information on the plan identified by the plan ID specified in Step S1. On the other hand, if it is determined that there is no such posted information associated with the user ID (NO in Step S3), the process proceeds to Step S9.

In Step S4, the posted information obtaining unit 41 of the system controller 4 obtains the posted information (i.e., first posted information) determined to exist in Step 3. Then, the subordinate rating criteria identification unit 42 of the system controller 4 performs a subordinate rating criteria search process based on the first posted information obtained in Step S4 (Step S5), and determines whether there are any subordinate rating criterion candidates (Step S6).

In the subordinate rating criteria search process of Step S5, for example, the subordinate rating criteria identification unit 42 divides a character string included in the first posted information and extracts words, morphemes, by morphological analysis, which is a type of natural language processing. Then, the subordinate rating criteria identification unit 42 retrieves subordinate rating criterion candidate(s) that match any of the extracted words from the rating criteria information database 24. That is, subordinate rating criterion candidate(s) that match any word included in the first posted information are retrieved from among the subordinate rating criterion candidates stored in the rating criteria information database 24. Thus, appropriate subordinate rating criteria can be identified more promptly and more accurately. The subordinate rating criteria identification unit 42 may obtain synonyms of the extracted words from a prepared dictionary and retrieve subordinate rating criterion candidate(s) that match any of the synonyms from the rating criteria information database 24. Alternatively, the subordinate rating criteria identification unit 42 may retrieve subordinate rating criterion candidate(s) associated with keyword(s) that match any of the extracted words or their synonyms from the rating criteria information database 24.

In Step S5, the subordinate rating criteria identification unit 42 may retrieve a positive word (e.g., "good") having a corresponding relationship with any of the above extracted words from the first posted information. For example, the subordinate rating criteria identification unit 42 refers a dictionary storing multiple types of positive words and retrieves word(s) that match any word stored in the dictionary from the first posted information. If a positive word is found in the first posted information, the subordinate rating criteria identification unit 42 determines whether the positive word has a corresponding relationship (e.g., a modification relation) with any of the above extracted words. Examples of the modification relation here include a subject-predicate relation and a modifier-modificand relation. In Step S5, the subordinate rating criteria identification unit 42 may retrieve a negative word (e.g., "bad") having a corresponding relationship with any of the above extracted words from the first posted information. For example, the subordinate rating criteria identification unit 42 refers a dictionary storing multiple types of negative words and retrieves word(s) that match any word stored in the dictionary from the first posted information. If a negative word is found in the first posted information, the subordinate rating criteria identification unit 42 determines whether the negative word has a corresponding relationship (e.g., a modification relation) with any of the above extracted words.

If subordinate rating criterion candidate(s) that match any of the above extracted words or their synonyms are found in the rating criteria information database 24, the subordinate rating criteria identification unit 42 determines that there are subordinate rating criterion candidate(s) (YES in Step S6), the process proceeds to Step S7. On the other hand, if no subordinate rating criterion candidates that match any of the above extracted words or their synonyms are found in the rating criteria information database 24, that is, if there are no subordinate rating criterion candidates that match any of the words included in the first posted information or their synonyms, the subordinate rating criteria identification unit 42 determines that there are no subordinate rating criterion candidates (NO in Step S6), and the process proceeds to Step S9. In this case, the subordinate rating criteria identification unit 42 may retrieve word(s) that match any of the above extracted words or their synonyms from the plan information associated with the plan ID specified in Step S1. Then, if word(s) that match any of the extracted words or their synonyms are found among the plan elements in the plan information or among the sub-categories assigned to the plan elements (see FIG. 3C), the found word(s) become the subordinate rating criterion candidate(s). Thus, even if no relevant subordinate rating criterion candidates are found in the rating criteria information database 24, appropriate subordinate rating criterion/criteria can be identified by utilizing the plan information.

In Step S7, the subordinate rating criteria identification unit 42 of the system controller 4 identifies the subordinate rating criterion candidate(s) determined to exist in Step S6 as the subordinate rating criterion/criteria. Here, if the subordinate rating criterion candidate(s) are word(s) found among the plan elements in the plan information or the sub-categories assigned to the plan elements, the system controller 4 may add the found word(s) as subordinate rating criterion candidate(s) to the rating criteria information database 24. This can increase the subordinate rating criterion candidates stored in the rating criteria information database 24. Thus, appropriate subordinate rating criterion/criteria can be more accurately identified in the subsequent steps.

Then, the subordinate rating criteria identification unit 42 stores, in the user information database 21, subordinate rating criteria information including, for example, the plan ID specified in Step S1, the subordinate rating criterion/criteria identified in Step S7, and the superordinate rating criterion/criteria to which the subordinate rating criterion/criteria belong, in association with the user ID specified in Step S2 (Step S8), and then the process proceeds to Step S21. That is, this subordinate rating criteria information indicates the subordinate rating criterion/criteria to be presented to the user who rates the plan identified by the plan ID specified in Step 1. If a positive word having a corresponding relationship with any of the words extracted in Step S5 is found, information indicating being positive is added to the subordinate rating criterion/criteria included in the subordinate rating criteria information stored in Step S8. If a negative word having a corresponding relationship with any of the words extracted in Step S5 is found, information indicating being negative is added to the subordinate rating criterion/criteria included in the subordinate rating criteria information stored in Step S8.

In Step S9, the system controller 4 determines whether there are any piece of posted information associated with the user ID specified in Step S2 or any pieces of posted information including the user ID (i.e., second posted information) among the piece(s) of posted information associated with plan ID(s) different from the plan ID specified in Step S1 in the plan information database 23. If it is determined that there are such piece(s) of posted information associated with the user ID (YES in Step S9), the process proceeds to Step S10. On the other hand, if it is determined that there is no such posted information associated with the user ID (NO in Step S9), the process proceeds to Step S15.

In Step S10, the posted information obtaining unit 41 of the system controller 4 obtains the piece(s) of posted information (i.e., second posted information) determined to exist in Step 9. It is preferable here that the posted information obtaining unit 41 obtains the piece(s) of second posted information associated with the plan ID(s) of plan(s) having a charge (charge system) similar to the charge for the plan identified by the plan ID specified in Step S1, from among the piece(s) of posted information determined to exist in Step 9. Thus, the accuracy of identifying subordinate rating criteria that the user, who is identified by the user ID specified in Step S2, attaches importance to or is concerned about can be improved. The reason is that the second posted information on a plan having a charge similar to the charge for the plan identified by the plan ID specified in Step S1 can possibly have criteria that the user attaches importance to or is concerned about in common with the posted information on the plan identified by the plan ID. Whether the charge for a plan is similar to the charge for another plan is determined, for example, based on whether the difference between the charges is less than or equal to a predetermined charge. If the difference between the charges is less than or equal to the predetermined charge, it is determined that the charges are similar.

Then, the subordinate rating criteria identification unit 42 of the system controller 4 performs the subordinate rating criteria search process based on the piece(s) of second posted information obtained in Step S10 (Step S11), and determines whether there are any subordinate rating criterion candidates (Step S12). When a plurality of pieces of second posted information are obtained in Step S10, the subordinate rating criteria search process is performed for each piece of second posted information.

In the subordinate rating criteria search process of Step S11, as in Step S5, the subordinate rating criteria identification unit 42 divides a character string included in the second posted information and extracts words, morphemes, by morphological analysis. Then, the subordinate rating criteria identification unit 42 retrieves subordinate rating criterion candidate(s) that match any of the extracted words or their synonyms from the rating criteria information database 24. It is preferable here that when the number of appearances (the number of descriptions in the character string included in the posted information) of the extracted words is greater than or equal to a threshold value, that is, when the extracted words appear frequently, the subordinate rating criteria identification unit 42 retrieves subordinate rating criterion candidate(s) that match any of the extracted words or their synonyms from the rating criteria information database 24. This enables word(s) that appear frequently in the second posted information or their synonym(s) to be identified as the subordinate rating criterion/criteria. Thus, the accuracy of identifying subordinate rating criteria that the user, who is identified by the user ID specified in Step S2, attaches importance to or is concerned about can be improved. When a plurality of pieces of second posted information are obtained in Step S10, the number of appearances of the extracted words in the pieces of second posted information is greater than or equal to a threshold value, the subordinate rating criteria identification unit 42 retrieves subordinate rating criterion/criteria that match any of the extracted words or their synonyms from the rating criteria information database 24. In Step S11, the subordinate rating criteria identification unit 42 may retrieve a positive word having a corresponding relationship with any of the above extracted words from the second posted information. In Step S11, the subordinate rating criteria identification unit 42 may retrieve a negative word having a corresponding relationship with any of the above extracted words from the second posted information.

If subordinate rating criterion candidate(s) that match any of the above extracted words or their synonyms are found in the rating criteria information database 24, the subordinate rating criteria identification unit 42 determines that there are subordinate rating criterion candidate(s) (YES in Step S12), and the process proceeds to Step S13. On the other hand, if no subordinate rating criterion candidates that match any of the above extracted words or their synonyms are found in the rating criteria information database 24, that is, if there are no subordinate rating criterion candidates that match any of the words included in the piece(s) of second posted information or their synonyms, the subordinate rating criteria identification unit 42 determines that there are no subordinate rating criterion candidates (NO in Step S12), and the process proceeds to Step S15. Also in this case, as in the above Step S6, the subordinate rating criteria identification unit 42 may retrieve word(s) that match any of the above extracted words or their synonyms from the plan information associated with the plan ID specified in Step S1. Then, if word(s) that match any of the extracted words or their synonyms are found among the plan elements in the plan information or among the sub-categories assigned to the plan elements, the found word(s) become the subordinate rating criterion candidate(s).

In Step S13, the subordinate rating criteria identification unit 42 of the system controller 4 identifies the subordinate rating criterion candidate(s) determined to exist in Step S12 as the subordinate rating criterion/criteria. Also in this case, as in Step S7, if the subordinate rating criterion candidate(s) are word(s) found among the plan elements in the plan information or the sub-categories assigned to the plan elements, the system controller 4 may add the found word(s) as subordinate rating criterion candidate(s) to the rating criteria information database 24. Then, the subordinate rating criteria identification unit 42 stores, in the user information database 21, subordinate rating criteria information including, for example, the plan ID specified in Step S1, the subordinate rating criterion/criteria identified in Step S13, and the superordinate rating criterion/criteria to which the subordinate rating criterion/criteria belong, in association with the user ID specified in Step S2 (Step S14), and then the process proceeds to Step S21. If a positive word having a corresponding relationship with any of the words extracted in Step S11 is found, information indicating being positive is added to the subordinate rating criterion/criteria included in the subordinate rating criteria information stored in Step S14. If a negative word having a corresponding relationship with any of the words extracted in Step S11 is found, information indicating being negative is added to the subordinate rating criterion/criteria included in the subordinate rating criteria information stored in Step S14.

In Step S15, the system controller 4 determines whether there are any pieces of posted information associated with other user ID(s) than the user ID specified in Step S2 or any pieces of posted information including the other user ID(s) among the piece(s) of posted information associated with the plan ID specified in Step S1 in the plan information database 23. If it is determined that there are such piece(s) of posted information associated with the other user ID(s) (YES in Step S15), the process proceeds to Step S16. On the other hand, if it is determined that there is no such posted information associated with the other user ID(s) (NO in Step S15), the process proceeds to Step S21.

In Step S16, the posted information obtaining unit 41 of the system controller 4 obtains the piece(s) of posted information (i.e., third posted information) determined to exist in Step 15. It is preferable here that the posted information obtaining unit 41 obtains the third posted information posted by other user(s) (the third posted information associated with the user ID(s) of the other user(s)) belonging to the same user base, which is one of a plurality of user bases into which the users are classified by user attributes, as the user identified by the user ID specified in Step S2, from among the piece(s) of posted information determined to exist in Step 15. Thus, the accuracy of identifying subordinate rating criteria that the user, who is identified by the user ID specified in Step S2, attaches importance to or is concerned about can be improved. Examples of the user attributes include gender, age, and addresses. Examples of the user bases include female users, users in their thirties, and users who live in Hokkaido. It is preferable, as in the above Step S10, that the posted information obtaining unit 41 obtains the piece(s) of third posted information associated with the plan ID(s) of plan(s) having a charge (charge system) similar to the charge for the plan identified by the plan ID specified in Step S1, from among the piece(s) of posted information determined to exist in Step 15. These piece(s) of third posted information may be piece(s) of posted information posted by other user(s) belonging to the same user base as the user identified by the user ID specified in Step S2 or posted by other user(s) not belonging to the user base.

Then, the subordinate rating criteria identification unit 42 of the system controller 4 performs the subordinate rating criteria search process based on the piece(s) of third posted information obtained in Step S16 (Step S17), and determines whether there are any subordinate rating criterion candidates (Step S18). Also in this case, as in the above Step S11, when a plurality of pieces of third posted information are obtained in Step S16, the subordinate rating criteria search process is performed for each piece of third posted information.

In the subordinate rating criteria search process of Step S17, as in Step S5, the subordinate rating criteria identification unit 42 divides a character string included in the third posted information and extracts words, morphemes, by morphological analysis. Then, the subordinate rating criteria identification unit 42 retrieves subordinate rating criterion candidate(s) that match any of the extracted words or their synonyms from the rating criteria information database 24. Also in this case, it is preferable, as in Step S11, that when the number of appearances of the extracted words is greater than or equal to a threshold value, the subordinate rating criteria identification unit 42 retrieves subordinate rating criterion candidate(s) that match any of the extracted words or their synonyms from the rating criteria information database 24. Also in this case, when a plurality of pieces of third posted information are obtained in Step S16, the number of appearances of the extracted words in the pieces of third posted information is greater than or equal to a threshold value, the subordinate rating criteria identification unit 42 retrieves subordinate rating criterion/criteria that match any of the extracted words or their synonyms from the rating criteria information database 24. When a plurality of pieces of third posted information are obtained in Step S16, the number of pieces of third posted information including the extracted words is greater than or equal to a threshold value, the subordinate rating criteria identification unit 42 may retrieve subordinate rating criterion/criteria that match any of the extracted words or their synonyms from the rating criteria information database 24. This enables words that are mentioned (described) by more users in the pieces of third posted information or their synonyms to be identified as the subordinate rating criterion/criteria. Thus, the accuracy of identifying subordinate rating criteria that the user, who is identified by the user ID specified in Step S2, attaches importance to or is concerned about can be improved. In Step S17, the subordinate rating criteria identification unit 42 may retrieve a positive word having a corresponding relationship with any of the above extracted words from the third posted information. In Step S17, the subordinate rating criteria identification unit 42 may retrieve a negative word having a corresponding relationship with any of the above extracted words from the third posted information.

If subordinate rating criterion candidate(s) that match any of the above extracted words or their synonyms are found in the rating criteria information database 24, the subordinate rating criteria identification unit 42 determines that there are subordinate rating criterion candidate(s) (YES in Step S18), and the process proceeds to Step S19. On the other hand, if no subordinate rating criterion candidates that match any of the above extracted words or their synonyms are found in the rating criteria information database 24, that is, if there are no subordinate rating criterion candidates that match any of the words included in the piece(s) of third posted information or their synonyms, the subordinate rating criteria identification unit 42 determines that there are no subordinate rating criterion candidates (NO in Step S18), and the process proceeds to Step S21. Also in this case, as in the above Step S6, the subordinate rating criteria identification unit 42 may retrieve word(s) that match any of the above extracted words or their synonyms from the plan information associated with the plan ID specified in Step S1. Then, if word(s) that match any of the extracted words or their synonyms are found among the plan elements in the plan information or among the sub-categories assigned to the plan elements, the found word(s) become the subordinate rating criterion candidate(s).

In Step S19, the subordinate rating criteria identification unit 42 of the system controller 4 identifies the subordinate rating criterion candidate(s) determined to exist in Step S18 as the subordinate rating criterion/criteria. Also in this case, as in Step S7, if the subordinate rating criterion candidate(s) are word(s) found among the plan elements in the plan information or the sub-categories assigned to the plan elements, the system controller 4 may add the found word(s) as subordinate rating criterion candidate(s) to the rating criteria information database 24. Then, the subordinate rating criteria identification unit 42 stores, in the user information database 21, subordinate rating criteria information including, for example, the plan ID specified in Step S1, the subordinate rating criterion/criteria identified in Step S19, and the superordinate rating criterion/criteria to which the subordinate rating criterion/criteria belong, in association with the user ID specified in Step S2 (Step S20), and then the process proceeds to Step S21. If a positive word having a corresponding relationship with any of the words extracted in Step S17 is found, information indicating being positive is added to the subordinate rating criterion/criteria included in the subordinate rating criteria information stored in Step S20. If a negative word having a corresponding relationship with any of the words extracted in Step S17 is found, information indicating being negative is added to the subordinate rating criterion/criteria included in the subordinate rating criteria information stored in Step S20.

Then, in Step S21, the system controller 4 determines whether there is any user ID yet to be specified in Step S2 (e.g., in the user ID list). If it is determined that there is a user ID yet to be specified (YES in Step S21), the process returns to Step S2. Then, a user ID yet to be specified, whose specified flag is "0", is specified, and the same process as above is performed. On the other hand, if there is no user ID yet to be specified (NO in Step S21), the specified flags of all the user IDs in the user ID list are reset to "0", and the process proceeds to Step S22.

In Step S22, the system controller 4 determines whether there is any plan ID yet to be specified in Step S1 (e.g., in the plan ID list). If it is determined that there is a plan ID yet to be specified (YES in Step S22), the process returns to Step S1. Then, a plan ID yet to be specified, whose specified flag is "0", is specified, and the same process as above is performed. On the other hand, if there is no plan ID yet to be specified (NO in Step S22), the specified flags of all the plan IDs in the plan ID list are reset to "0", and then the rating criteria identification process shown in FIG. 5 ends.

In the above rating criteria identification process, Steps S3 to S7 for the first posted information, Steps S9 to S13 for the second posted information, and Steps S15 to S19 for the third posted information may be independently performed. In this case, a subordinate rating criteria list is generated in which the subordinate rating criterion/criteria identified in Step 7 is given the highest priority, the subordinate rating criterion/criteria identified in Step S13 is given the second highest priority, and the subordinate rating criterion/criteria identified in Step S19 is given the lowest priority. Then, the subordinate rating criteria identification unit 42 determines a top predetermined number of subordinate rating criterion/criteria with higher priority as final subordinate rating criterion/criteria, and stores subordinate rating criteria information including, for example, the determined subordinate rating criterion/criteria in association with the user ID specified in Step S2, in the user information database 21.

2-2. Subordinate Rating Criteria Presentation Process

First Example

Figure 6:
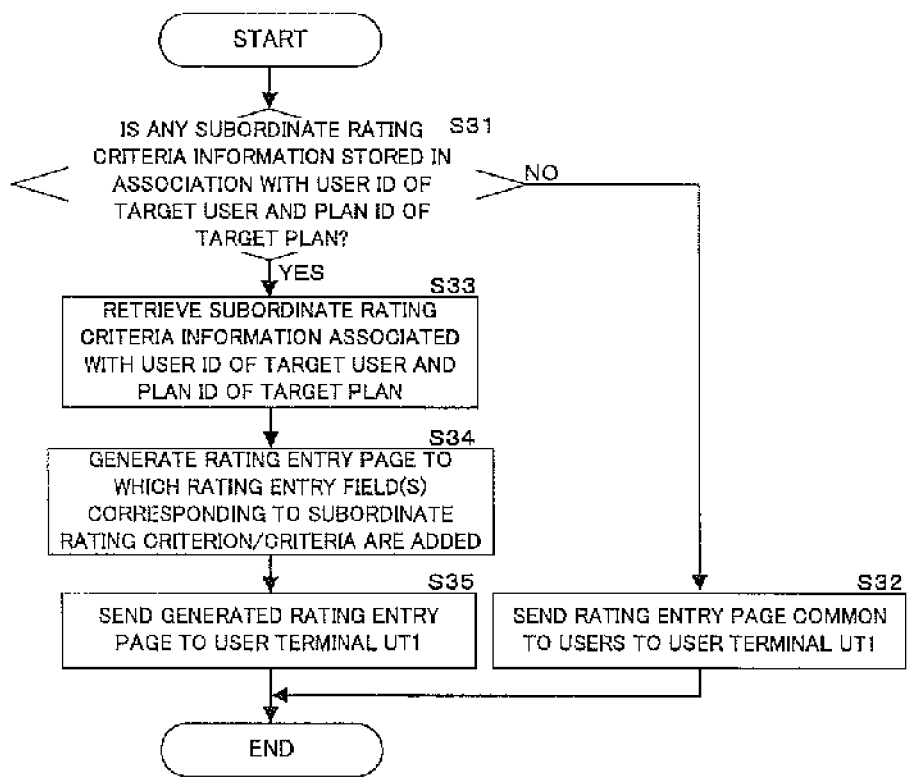
FIG. 6 is a flowchart indicating the first example of the subordinate rating criteria presentation process in the system controller 4 of the information providing server SA.

The following describes a first example of the subordinate rating criteria presentation process in the system controller 4 of the information providing server SA with reference to FIG. 6. FIG. 6 is a flowchart indicating the first example of the subordinate rating criteria presentation process in the system controller 4 of the information providing server SA. In the first example, assume that the user α of the user terminal UT1 has logged in to the facility reservation site through a login process in the information providing server SA. This user α is a user who finished using the plan XA reserved through the facility reservation site and is at the stage of rating the plan XA. When receiving a rating entry page request sent from the user terminal UT1 in accordance with an instruction from the logged-in user α, the information providing server SA initiates the subordinate rating criteria presentation process shown in FIG. 6. This rating entry page is a web page for the user to enter ratings for the plan XA.

When the process shown in FIG. 6 is initiated, the system controller 4 of the information providing server SA determines whether any subordinate rating criteria information is stored in association with the user ID of the user α (target user) of the user terminal UT1, which has sent the rating entry page request, and the plan ID of the plan XA (target plan) in the user information database 21 (Step S31). If it is determined that no subordinate rating criteria information is stored in association with the user ID and the plan ID in the user information database 21 (NO in Step S31), the process proceeds to Step S32. On the other hand, if it is determined that any subordinate rating criteria information is stored in association with the user ID and the plan ID in the user information database 21 (YES in Step S31), the process proceeds to Step S33.

In Step S32, the system controller 4 sends a rating entry page common to users to the user terminal UT1. Thus, the rating entry page common to users is displayed in the window screen through the web browser of the user terminal UT1. The rating entry page thus displayed includes rating entry fields corresponding to the superordinate rating criteria.

In Step S33, the system controller 4 retrieves the subordinate rating criteria information associated with the user ID of the user α (target user) of the user terminal UT1 and the plan ID of the plan XA (target plan) from the user information database 21. Subsequently, the subordinate rating criteria presentation unit 44 of the system controller 4 generates a rating entry page by adding rating entry field(s) corresponding to the subordinate rating criterion/criteria indicated by the subordinate rating criteria information retrieved in S33 to the rating entry page common to users (Step S34).

Then, the subordinate rating criteria presentation unit 44 sends the rating entry page generated in Step S34 to the user terminal UT1 (Step S35). Thus, the rating entry page to which the rating entry field(s) corresponding to the subordinate rating criterion/criteria are added is displayed in the window screen through the web browser of the user terminal UT1. Consequently, the subordinate rating criterion/criteria identified in the rating criteria identification process shown in FIG. 5 is presented to the user α on the rating entry page. FIG. 7 is a diagram showing a display example of the rating entry page to which the rating entry fields corresponding to the subordinate rating criteria are added. The rating entry page shown in FIG. 7 includes rating entry fields corresponding to a plurality of superordinate rating criteria 51 to 56, and also includes a rating entry field corresponding to a subordinate rating criterion 53a associated with a superordinate rating criterion 53 and rating entry fields corresponding to subordinate rating criteria 54a and 54b associated with a superordinate rating criterion 54. With such a rating entry page displayed, the user α of the user terminal UT1 enters ratings on the superordinate rating criteria and the subordinate rating criteria through an input unit by selecting radio buttons 57 in the rating entry fields. After that, for example, when the user selects a registration button (not shown), the user terminal UT1 sends rating information indicating the ratings on the rating criteria to the information providing server SA. Then, the system controller 4 of the information providing server SA stores the rating information received from the user terminal UT1 in association with the plan ID of the plan XA and the user ID of the user α in the plan information database 23. The rating information thus stored can be viewed by other users.

When receiving the rating entry page request sent from the user terminal UT1 in accordance with the instruction from the logged-in user α, the information providing server SA may perform Step S3 and subsequent steps shown in FIG. 5 and then perform the process shown in FIG. 6.

Second Example

The following describes a second example of the subordinate rating criteria presentation process in the system controller 4 of the information providing server SA with reference to FIG. 8. FIG. 8 is a flowchart indicating the second example of the subordinate rating criteria presentation process in the system controller 4 of the information providing server SA. In the second example, ratings on the superordinate rating criteria are entered before ratings on the subordinate rating criteria. That is, rating information indicating the ratings on the superordinate rating criteria is sent to the information providing server SA, and then the ratings on the subordinate rating criteria are entered. When receiving the rating information, which indicates the ratings for the plan XA on the superordinate rating criteria, sent from the user terminal UT1 in accordance with an instruction from the logged-in user α, the information providing server SA initiates the subordinate rating criteria presentation process shown in FIG. 8.

When the process shown in FIG. 8 is initiated, the system controller 4 of the information providing server SA stores the rating information received from the user terminal UT1 in association with the plan ID of the plan XA and the user ID of the user α in the plan information database 23 (Step S41). Then, the system controller 4 determines whether any subordinate rating criteria information is stored in association with the user ID of the user α (target user) of the user terminal UT1, which has sent the rating information, and the plan ID of the plan XA (target plan) in the user information database 21 (Step S42). If it is determined that no such subordinate rating criteria information is stored in the user information database 21 (NO in Step S42), the process shown in FIG. 8 ends. On the other hand, if it is determined that such subordinate rating criteria information is stored in the user information database 21 (YES in Step S42), the process proceeds to Step S43.

In Step S43, the system controller 4 retrieves the subordinate rating criteria information associated with the user ID of the user α (target user) and the plan ID of the plan XA (target plan) from the user information database 21. Subsequently, the value obtaining unit 43 of the system controller 4 obtains rating values relating to the ratings on the superordinate rating criteria from the rating information received from the user terminal UT1 (Step S44).

Then, the system controller 4 determines whether there is any superordinate rating criterion on which the rating value obtained in Step S44 is greater than or equal to a first threshold value (e.g., 4 on a scale of 5), among the superordinate rating criterion/criteria included in the subordinate rating criteria information retrieved in Step S43 (Step S45). If it is determined that there are superordinate rating criterion/criteria on which the rating value(s) are greater than or equal to the first threshold value (YES in Step S45), the process proceeds to Step S46. On the other hand, if it is determined that there is no superordinate rating criterion on which the rating value is greater than or equal to the first threshold value (NO in Step S45), the process proceeds to Step S48.

In Step S46, the system controller 4 determines whether there is any subordinate rating criterion to which the information indicating being positive is added, among the subordinate rating criteria belonging to the superordinate rating criterion/criteria on which the above rating value(s) are greater than or equal to the first threshold value, in the subordinate rating criteria information retrieved in Step S43. If it is determined that there are subordinate rating criterion/criteria to which the information indicating being positive is added (YES in Step S46), the process proceeds to Step S47. On the other hand, if it is determined that there is no subordinate rating criterion to which the information indicating being positive is added (NO in Step S46), the process proceeds to Step S48.

In Step S47, the system controller 4 identifies the subordinate rating criterion/criteria to which the information indicating being positive is added (i.e., subordinate rating criterion/criteria having a corresponding relationship with a positive word) and the superordinate rating criterion/criteria to which the subordinate rating criterion/criteria belong, from the subordinate rating criteria information retrieved in Step S43, and the process proceeds to Step S48. Thus, when a high rating is given by a user on a superordinate rating criterion, criterion/criteria that belong to the superordinate rating criterion and to which the user paid positive attention can be identified as the subordinate rating criterion/criteria.

In Step S48, the system controller 4 determines whether there is any superordinate rating criterion on which the rating value obtained in Step S44 is less than or equal to a second threshold value (e.g., 2 on a scale of 5), among the superordinate rating criterion/criteria included in the subordinate rating criteria information retrieved in Step S43. If it is determined that there are superordinate rating criterion/criteria on which the rating value(s) are less than or equal to the second threshold value (YES in Step S48), the process proceeds to Step S49. On the other hand, if it is determined that there is no superordinate rating criterion on which the rating value is less than or equal to the second threshold value (NO in Step S48), the process proceeds to Step S51.

In Step S49, the system controller 4 determines whether there is any subordinate rating criterion to which the information indicating being negative is added, among the subordinate rating criteria belonging to the superordinate rating criterion/criteria on which the above rating value(s) are less than or equal to the second threshold value, in the subordinate rating criteria information retrieved in Step S43. If it is determined that there are subordinate rating criterion/criteria to which the information indicating being negative is added (YES in Step S49), the process proceeds to Step S50. On the other hand, if it is determined that there is no subordinate rating criterion to which the information indicating being negative is added (NO in Step S49), the process proceeds to Step S51.

In Step S50, the system controller 4 identifies the subordinate rating criterion/criteria to which the information indicating being negative is added (i.e., subordinate rating criterion/criteria having a corresponding relationship with a negative word) and the superordinate rating criterion/criteria to which the subordinate rating criterion/criteria belong, from the subordinate rating criteria information retrieved in Step S43, and the process proceeds to Step S51. Thus, when a low rating is given by a user on a superordinate rating criterion, criterion/criteria that belong to the superordinate rating criterion and to which the user paid negative attention can be identified as the subordinate rating criterion/criteria.

In Step S51, the system controller 4 determines whether there is any subordinate rating criterion identified in at least one of Steps S47 and S50. If it is determined that there are such identified subordinate rating criterion/criteria (YES in Step S51), the process proceeds to Step S52. On the other hand, if it is determined that there is no such identified subordinate rating criterion (NO in Step S51), the process proceeds to Step S53.

In Step S52, the system controller 4 newly generates subordinate rating criteria information including the subordinate rating criterion/criteria identified in at least one of Steps S47 and S50 and the superordinate rating criterion/criteria to which the subordinate rating criterion/criteria belong, and the process proceeds to Step S53.

In Step S53, the subordinate rating criteria presentation unit 44 of the system controller 4 sends the subordinate rating criteria information retrieved in Step S43 or the subordinate rating criteria information generated in Step S52 to the user terminal UT1. Thus, rating entry field(s) on the subordinate rating criterion/criteria included in the subordinate rating criteria information received by the user terminal are embedded in a rating entry page and displayed by the web browser. Consequently, the subordinate rating criterion/criteria are presented to the user α on the rating entry page. In Step S53, the subordinate rating criteria presentation unit 44 of the system controller 4 may generate a rating entry page including rating entry field(s) corresponding to the subordinate rating criterion/criteria included in the subordinate rating criteria information retrieved in Step S43 or the subordinate rating criteria information generated in Step S52 and send the page to the user terminal UT1.

When receiving the rating information, which indicates the ratings for the plan XA on the superordinate rating criteria, sent from the user terminal UT1 in accordance with the instruction from the logged-in user α, the information providing server SA may perform Step S3 and subsequent steps shown in FIG. 5 and then perform the process shown in FIG. 8.

As described above, according to the above embodiment, the information providing server SA obtains at least one of the first posted information on the plan XA posted by the user α, the piece(s) of second posted information on the other plan(s) posted by the user α, and the piece(s) of third posted information on the plan XA posted by the other user(s). Then, the information providing server SA identifies the subordinate rating criterion/criteria used for the user α to rate the plan XA based on the obtained piece(s) of posted information, and presents the identified subordinate rating criterion/criteria to the user α who rates the plan XA. By presenting minimum subordinate rating criterion/criteria to the user α, the information providing server SA can reduce the rating burden on the user α as a rater and present appropriate subordinate rating criterion/criteria to the user α. In some cases, a user's ratings and review may be inconsistent with each other. For example, the user's ratings are high, but the user's review includes a negative reference. Such high ratings are seemingly positive, but the details of the review actually show not a few negative comments. Even in such a case, according to this embodiment, ratings on more specific subordinate rating criteria can be obtained from the rater. Thus, detailed ratings for a certain plan can be provided to users.

Although described as plans provided by facilities in the above embodiment, the transaction objects may be items or services other than such plans.

EXPLANATION OF REFERENCE NUMERALS 1 communication unit
2 storage unit
3 Input/Output Interface Unit
4 System Controller
5 System Bus
UTn User Terminal
STm Facility Terminal
SA Information Providing Server
NW Network

The invention claimed is:

1. An information processing system comprising:
   at least one first memory configured to store computer program code;
   at least one second memory configured to store posted information;
   at least one third memory configured to store rating criteria; and
   at least one processor configured to access said at least one first memory and operate as instructed by said computer program code, said computer program code including:
      first receiving code configured to receive, from a terminal device, a rating entry request sent in accordance with an instruction from a first user who is about to rate a first transaction object;
      first obtaining code configured to cause at least one of said at least one processor to obtain, from the at least one second memory configured to store posted information, at least one of first posted information on the first transaction object, second posted information on a second transaction object that is different from the first transaction object, and third posted information on the first transaction object, the first and second posted information being posted by the first user, the third posted information being posted by a second user that is different from the first user, wherein each of the first and second transaction objects is transacted via a network and displayed on a display screen;
      identifying code configured to cause at least one of said at least one processor to identify a word included in a piece of the obtained posted information or a synonym for the word as a subordinate rating criterion, by referring to the at least one third memory configured to store a plurality of superordinate rating criteria common to users and subordinate rating criteria belonging to each of the plurality of superordinate rating criteria;
      display controlling code configured to cause at least one of said at least one processor to, in response to receiving the rating entry request, control a display screen of the terminal device to display rating entry fields corresponding to the plurality of superordinate rating criteria and a rating entry field corresponding to the identified subordinate rating criterion;
      second receiving code configured to receive, from the terminal device, rating information indicating ratings that the first user inputs in the rating entry fields displayed on the display screen of the terminal device; and
      providing code configured to provide the received rating information to other users.

2. The information processing system according to claim 1, wherein the second obtaining code is further configured to cause at least one of said at least one processor to obtain a rating value relating to a rating, given by the first user, for the first transaction object on a superordinate rating criterion corresponding to a superordinate concept of the subordinate rating criterion identified, and
   wherein when the rating value obtained is greater than or equal to a first threshold value, the identifying code is further configured to cause at least one of said at least one processor to identify, as the subordinate rating criterion, a word having a corresponding relationship with a positive word included in the posted information obtained.

3. The information processing system according to claim 1, the program code further comprising:
   second obtaining code configured to cause at least one of said at least one processor to obtain a rating value relating to a rating, given by the user, for the first transaction object on a superordinate rating criterion corresponding to a superordinate concept of the subordinate rating criterion identified, wherein,
   when the rating value obtained is less than or equal to a second threshold value, the identifying code is further configured to cause at least one of said at least one processor to identify, as the subordinate rating criterion, a word having a corresponding relationship with a negative word included in the posted information obtained.

4. The information processing system according to claim 1, wherein
   the identifying code is further configured to cause at least one of said at least one processor to identify, as the subordinate rating criterion, a rating criterion candidate matching any word included in the posted information obtained, among rating criterion candidates prestored for each transaction object type in a storage.

5. The information processing system according to claim 4, wherein,
   when no rating criterion candidates match any word included in the posted information, the identifying code is further configured to cause at least one of said at least one processor to identify, as the subordinate rating criterion, a word included in the posted information, among words included in information prestored in said storage and indicating details of the first transaction object.

6. The information processing system according to claim 5, wherein, when the identifying code is further configured to cause at least one of said at least one processor to identify, as the subordinate rating criterion, a word included in information indicating details of the first transaction object, the word identified as the subordinate rating criterion is added to and stored in the storage as the rating criterion candidates.

7. The information processing system according to claim 1, wherein
users are classified by user attributes into a plurality of user bases, and
the first obtaining code is further configured to cause at least one of said at least one processor to obtain the third posted information posted by the second user, wherein the second user and the first user are classified into the same user base.

8. An information processing method performed by a computer, the method comprising:
receiving, from a terminal device, a rating entry request sent in accordance with an instruction from a first user who is about to rate a first transaction object;
obtaining, from at least one first memory configured to store posted information, at least one of first posted information on the first transaction object, second posted information on a second transaction object that is different from the first transaction object, and third posted information on the first transaction object, the first and second posted information being posted by the first user, the third posted information being posted by a second user that is different from the first user, wherein each of the first and second transaction objects is transacted via a network and displayed on a display screen;
identifying a word included in a piece of the obtained posted information or a synonym for the word as a subordinate rating criterion, by referring to at least one second memory configured to store a plurality of superordinate rating criteria common to users and subordinate rating criteria belonging to each of the plurality of superordinate rating criteria;
in response to receiving the rating entry request, displaying, on a display screen of the terminal device, rating entry fields corresponding to the plurality of superordinate rating criteria and a rating entry field corresponding to the identified subordinate rating criterion;
receiving, from the terminal device, rating information indicating ratings that the first user inputs in the rating entry fields displayed on the display screen of the terminal device; and
providing the received rating information to other users.

9. The information processing method according to claim 8, further comprising
obtaining a rating value relating to a rating, given by the user, for the first transaction object on a superordinate rating criterion corresponding to a superordinate concept of the subordinate rating criterion identified, wherein
when the rating value obtained is greater than or equal to a first threshold value, identifying, as the subordinate rating criterion, a word having a corresponding relationship with a positive word included in the posted information obtained.

10. The information processing method according to claim 8, further comprising
obtaining a rating value relating to a rating, given by the user, for the first transaction object on a superordinate rating criterion corresponding to a superordinate concept of the subordinate rating criterion identified, wherein,
when the rating value obtained is less than or equal to a second threshold value, identifying, as the subordinate rating criterion, a word having a corresponding relationship with a negative word included in the posted information obtained.

11. The information processing method according to claim 8, wherein
identifying, as the subordinate rating criterion, a rating criterion candidate matching any word included in the posted information obtained, among rating criterion candidates prestored for each transaction object type in a storage.

12. The information processing method according to claim 9, wherein
the identifying further comprises identifying, as the subordinate rating criterion, a rating criterion candidate matching any word included in the posted information obtained, among rating criterion candidates prestored for each transaction object type in a storage.

13. The information processing method according to claim 10, wherein
the identifying further comprises identifying, as the subordinate rating criterion, a rating criterion candidate matching any word included in the posted information obtained, among rating criterion candidates prestored for each transaction object type in a storage.

14. The information processing system according to claim 1, wherein the identifying code is further configured to cause at least one of said at least one processor to further identify, by referring to the at least one third memory, a superordinate rating criterion to which the identified subordinate rating criterion belongs, and the display controlling code is further configured to cause at least one of said at least one processor to, in response to receiving the rating entry request, control the display screen of the terminal device to display a rating entry page including rating entry fields corresponding to the plurality of superordinate rating criteria, and a rating entry field corresponding to the identified subordinate rating criterion, the rating entry field being arranged in association with the identified superordinate rating criterion.

15. The information processing system according to claim 1, wherein the identifying code is further configured to cause at least one of said at least one processor to, when a positive word or a negative word is included in a piece of the obtained posted information, identify a word having a corresponding relationship with the positive word or the negative word or a synonym for the word as a subordinate rating criterion, by referring to the at least one third memory.

16. An information processing system comprising:
at least one first memory configured to store computer program code;
at least one second memory configured to store posted information;
at least one third memory configured to store rating criteria; and
at least one processor configured to access said at least one first memory and operate as instructed by said computer program code, said computer program code including:
first receiving code configured to receive, from a terminal device, a rating entry request sent in accordance with an instruction from a first user who is about to rate a first transaction object;

first obtaining code configured to cause at least one of said at least one processor to obtain, from the at least one second memory configured to store posted information, at least one of first posted information on the first transaction object and second posted information on a second transaction object that is different from the first transaction object, the first and second posted information being posted by the first user, wherein each of the first and second transaction objects is transacted via a network and displayed on a display screen;

identifying code configured to cause at least one of said at least one processor to identify a word included in a piece of the obtained posted information or a synonym for the word as a subordinate rating criterion, by referring to the at least one third memory configured to store a plurality of superordinate rating criteria common to users and subordinate rating criteria belonging to each of the plurality of superordinate rating criteria;

display controlling code configured to cause at least one of said at least one processor to, in response to receiving the rating entry request, control a display screen of the terminal device to display rating entry fields corresponding to the plurality of superordinate rating criteria and a rating entry field corresponding to the identified subordinate rating criterion;

second receiving code configured to receive, from the terminal device, rating information indicating ratings that the first user inputs in the rating entry fields displayed on the display screen of the terminal device; and providing code configured to provide the received rating information to other users.

* * * * *